United States Patent
Brahma Raju et al.

(10) Patent No.: US 9,734,157 B1
(45) Date of Patent: Aug. 15, 2017

(54) METHOD FOR SUB-BLOCK OPERATIONS ON A JOURNAL BLOCK USING RANGED LOCKING

(71) Applicant: EMC Corporation, Hopkinton, MA (US)

(72) Inventors: Suraj Brahma Raju, Bellevue, WA (US); Ronald Steinke, Tacoma, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 291 days.

(21) Appl. No.: 14/585,992

(22) Filed: Dec. 30, 2014

(51) Int. Cl.
 *G06F 9/46* (2006.01)
 *G06F 17/30* (2006.01)

(52) U.S. Cl.
 CPC .... *G06F 17/30171* (2013.01); *G06F 17/3033* (2013.01)

(58) Field of Classification Search
 USPC .................................................. 707/704, 698
 See application file for complete search history.

(56) References Cited

U.S. PATENT DOCUMENTS

| 6,772,155 B1 * | 8/2004 | Stegelmann | G06F 17/30362 |
| 8,996,563 B2 * | 3/2015 | Bender | G06F 17/30306 |
| | | | 707/769 |
| 2009/0019047 A1 * | 1/2009 | Anderson | G06F 17/30171 |

* cited by examiner

*Primary Examiner* — Hung T Vy
(74) *Attorney, Agent, or Firm* — Krishnendu Gupta (57) ABSTRACT

Implementations are provided herein for sub-block ranged locking on a journal block. A file system locking scheme can be adjusted to provide ranged locks on sub-blocks of a journal block. By locking sub-block ranges of a journal block, two independent operations on the same block that do not overlap on a sub-block range can operate independent of each other and be processed concurrently without requiring an exclusive lock over the entire block. Delta write locks, delta read locks, and shared locks can be established on a sub-block range level.

18 Claims, 6 Drawing Sheets

METHOD FOR SUB-BLOCK OPERATIONS ON A JOURNAL BLOCK USING RANGED LOCKING

FIELD OF THE INVENTION

This invention relates generally to processing data, and more particularly to systems and methods for multiple concurrent cursors for file repair within large scale storage systems.

BACKGROUND OF THE INVENTION

Distributed file systems offer many compelling advantages in establishing high performance computing environments. One example is the ability to easily expand, even at large scale. An example distributed file system is one that is distributed across multiple nodes in a cluster of nodes. An individual node can encompass a set of storage drives capable of storing data accessible by clients of the clusters of nodes. In some distributed file systems, files or objects can striped across different physical storage devices in a single node or across multiple nodes of a cluster. With multiple clients capable of interacting and requesting operations on files to multiple nodes, many times there are operations that are executed by multiple threads, processes and applications distributed across one or more nodes. For example, more than one thread or process may demand to concurrently write data to the same file in a file system.

File system locks can be used that allow one client to access data under locking conditions that prevent another client from performing certain operations on the locked data. For example, readers usually use locks that prevent the file from changing while the file is being read. And, because readers will not change a file there may be multiple readers of a file each holding a lock preventing the file from being altered during while being read. Writers usually use locks that are exclusive so the writer can alter the file without being concerned about the actions of other writers or readers. Accordingly, if writers attempt to write to a file, writers must wait until other lock-holders (e.g., readers or writers) have finished with the file and have released their locks. If all locks are released a writer can then obtain its own exclusive lock for writing to the file.

In a distributed file system, such as a cluster of nodes, file system operations can be viewed as multi-layered. The first layer decodes what the operation is trying to accomplish, including assessing which nodes, including the node processing the operation, among the cluster of nodes are storing data that the operation is dependent on. As the operation progresses, a journal can be used as a means to provide more guarantees for requested operations, by first having the operations logged into a journal, (e.g., an in-memory storage space such as a cache or a buffer cache), and then later committing the operations logged in the journal to stable disk storage. Most entries in a journal involve either file data blocks or metadata blocks. For some journal entries, such as those relating to metadata blocks, a journal entry only relates to a small portion or a small set of sub-blocks of a metadata block. However, in order to process journal entries that affect a set of sub-blocks, for example an order dependent operation, a lock may have to be used on the entire block prohibiting other operations from being processed on sub block unrelated to the journal entry in question. Thus, there exists a need to support concurrent compatible data operations on different, non-overlapping ranges of a single journal block.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a journal of a set of transactions to be committed to stable storage of a file system can be maintained, wherein the set of transactions are associated with a set of delta fields associated with a logical inode ("LIN") of the file system. A ranged BTL hash table can be maintained wherein the ranged BTL hash table tracks locking states of a set of sub block ranges associated with the set of delta fields associated with the LIN. A first write transaction associated with a first subset of the set of sub block ranges associated with the set of delta fields can be received. The first write transaction can be stored in the journal. A first shared lock can be established on the set of the delta fields. A first BTL can be established on the first subset of the set of sub block ranges, wherein establishing the BTL includes updating the ranged BTL hash table to indicate the first BTL on the first subset of the set of sub block ranges.

In accordance with another aspect, a second write transaction associated with a second subset of the set of sub block ranges associated with the set of delta fields can be received, wherein the second subset of the set of sub block ranges and the first subset of the set of sub block ranges do not intersect. The second write transaction can be stored in the journal. A second shared lock can be established on the set of the delta fields. A second BTL can be established on the second subset of the set of sub block ranges, wherein establishing the second BTL includes updating the ranged BTL hash table to indicate a second BTL on the second subset of the set of sub block ranges. The first write transaction can be committed from the journal to stable storage and the second write transaction from the journal to stable storage wherein committing the first write transaction and committing the second write transaction occur independently and concurrently.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

U.S. patent application Ser. No. 13/461,637 Titled "Multiple Writers to a Single File", U.S. Pat. No. 7,752,402 titled "Systems and Methods for Allowing Incremental Journaling", U.S. Pat. No. 7,676,691 titled "Systems and Methods for Providing Nonlinear Journaling", U.S. Pat. No. 7,822,932 titled "Systems and Methods for Providing Nonlinear Journaling", U.S. Pat. No. 7,899,800 titled "Systems and Methods for Providing Nonlinear Journaling", U.S. Pat. No. 7,346,720 titled "Systems and Methods for Managing Concurrent Access Requests to a Shared Resource" are hereby incorporated by reference.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

"Delta data" as used herein, refers to data elements, fields, or ranges, of a data structure where updates to such data may be recorded in a journaling system rather than being applied directly to actual instance of the data structure. Example delta fields of a metadata structure include block type, block counts, inode identifier, last modified timestamp, etc. Delta fields can also be established in custom data structures, such as fields within a "Mirrored Data Structure" ("MDS") extension block header relating to multiple cursors used to restripe data in a distributed file system. Another example of an MDS is a B-tree. In one implementation, Delta fields can be customized to be 1, 2, 4 or 8 bytes. It can be appreciated that a single delta field, for example, an 8 byte delta field, in a file system that maintains 8 kilobyte data blocks, is a small sub-block range of the data block itself.

"Non-delta data" as used herein, refers to data elements, fields, or ranges, of a data structure where updates to such data may be applied directly to an instance of the data structure rather than recorded as journal deltas. It can be appreciated that a single data structure can have both non-delta data fields and delta data fields.

"Journal deltas" as used herein, refers to entries or records stored in a journaling system that may record or track changes made to the delta data of a data structure instance.

"Coherent read" as used herein refers to a read where the exact coherent value of all data fields of a block at a specific moment in time is requested by a client, process, thread, etc.

"Incoherent read" as used herein refers to a read that is discriminative only to the sub-blocks of the block that the client, process or thread wants to coherently read, and beyond those discriminative regions, the request does not care if the extraneous regions are accurate.

"Concurrently" as used herein, refers to multiple writers, readers or cursors accessing the same file at the same time. Multiple writers may be writing to the same file; multiple readers may be reading from the same file; multiple cursors may be restriping the same file, or a mix of writers, readers, and cursors may be writing, reading, and restriping from the same file at the same time.

"Exclusive locks" as used herein, refers to a lock that does not allow any other locks of any kind on the same block and/or sub block.

"Shared locks" as used herein, refers to a lock that allows reading of non-delta data and/or delta data coherently. Multiple shared locks can be active at the same time for the same block and/or sub block.

"Delta read locks" as used herein, refers to a lock that allows the reading of delta data but does not guarantee the reading of non-delta data.

"Delta write locks" as used herein, refers to a lock that allows other processes to read non-delta data, other processes can apply delta changes (e.g., other delta write locks can be active at the same time to the same block or sub-block), prevents a shared lock being allowed on the same block or sub-block at the same time.

"BTL" as used herein refers to Buffer Transaction Lock. A ranged BTL refers to a lock on a sub-block range of a block of the buffer transaction log. It can be appreciated that a BTL is a bottom half lock while locks like the exclusive locks, shared locks, delta write locks, and delta read locks are top half locks. Thus, as disclosed herein, ranged BTL's can be tracked in a Ranged BTL hash table, and can operate independently of top half locks. For example, a lock ordering method can exist regarding the interdependence of top half locks and bottom half locks. A transaction can first take a top half lock (e.g., a LIN lock, an MDS lock, etc. that is cluster wide) and then take a bottom half lock, like a ranged BTL as described below, at the node level. Following a commit (e.g., a successful completion of the transaction), the top half lock can be released while the bottom half locks can be held until the blocks are committed from the buffer transaction log to stable storage on disk. Continuing the example, the top half locks can then be taken again; however, they can wait for the BTL held by the first operation to finish for any needed coherency as described below.

In most computing systems if writers or readers request access to shared resources (e.g., files) they may rely on locking mechanisms to indicate to operating systems and other writers or readers that access to the shared resource is requested. For some resources, such as computer files, writers or readers may require exclusive access to one or more portions of the resource. In most computing systems, contention over shared system resources among multiple writers or readers may be managed by a locking system. Most computing file systems and/or computing operating systems provide system calls and/or application programming interfaces (API's) enabling writers or readers to obtain appropriate locks on file resources before taking action. In at least one of the various implementations, if a writer or reader has obtained the appropriate lock the operating system may ensure that the "locked" file resource remains consistent as long as the lock remains in place. In some embodiments, the lock protocol may establish a contract between a file system that defines the relationships between and among different lock types, and writers or readers of a file. For example, in some embodiments, writers may require a lock type that may indicate that the writer may change (e.g., write or delete) the state and/or contents of a file, a block of data, or a sub block of data. Whereas readers may use a lock type that indicates that the resource is being read but it may not be altered by the reader holding the lock. Some computing systems may designate lock types of "shared" and "exclusive." Lock types categorized as shared locks may indicate that multiple readers can obtain a shared lock on the same file. However, file systems and operating systems usually enforce the requirement that holders of shared locks may read a file and may not disturb the contents of the file. If a writer wants to write to a file resource most computing systems require the writer to obtain an exclusive lock. One writer can have an exclusive lock on a resource. This may force writers requesting exclusive locks to wait until all other writers, or readers (e.g., any lock holders) have finished working with the target resources (i.e., indicated if they release their locks.)

In at least one of the various implementations, resources, such as inodes, may have some data fields where the value or state of the data does not have be known, consistent, and coherent among all writers or readers all of the time. In at least one of the various implementations, resources may be partitioned into non-delta data and delta data. Delta data may be fields of the resource determined to be eligible for modification by more than one writer at the same time. Non-delta data may be fields of the resource that may be written to by one writer at a time. In at least one of the various embodiments, writers or readers may rely on the combination of the delta data and the non-delta data for a correct representation of the resource.

In at least one of the various implementations, at least four types of locks are available for writers or readers. These may include, exclusive locks, shared locks, delta read locks, and delta write locks. Exclusive locks may enable writers or readers to have exclusive access to a resource. Typically, an exclusive lock may be used if a writer, intends to modify or delete at least a portion of a file or metadata data structure. Conversely, shared locks may be obtained if writers or readers intend to read at least a portion of a file or metadata data structure and not modify them. In at least one of the various embodiments, multiple writers or readers may obtain shared locks on the same resource at the same time because the shared lock may imply that the resource data may be undisturbed while the shared lock(s) are held because the lock holders may be reading data from a resource rather than writing. Likewise, in at least one of the various embodiments, holding a shared lock on a resource may imply that other writers or readers may not modify any fields or properties of the resource as long as a shared lock is held.

In at least one of the various implementations, if a delta write lock is requested, a writer may be indicating to the locking system that it intends to update or modify the delta data portions of the resource. If a delta read lock is requested by a reader, the reader may be signaling that it may not care about the non-delta data portions of the resource and it may rely on the delta data portions of the resource remaining unchanged. In at least one of the various embodiments, writers that obtain delta write locks on resources may be allowed to modify the delta data portions of the locked resources by saving journal deltas into a journaling system that may resolve the modifications made to the delta data later. In one of the various implementations, journal deltas may be resolved and reconciled when a process attempts to obtain a lock on the resource that may be incompatible with the resource being in an incoherent state (e.g., shared locks, and exclusive locks). For example, in at least one of the various embodiments, before a process may obtain an exclusive lock on a sub-block range of a data structure, all delta write locks must be released on any sub block range that overlaps the request, and the corresponding journal deltas that may have been recorded for any modifications may be reconciled and resolved before granting an exclusive lock on the sub-block range to the requesting process.

Implementations are provided herein for sub-block ranged locking on a journal block. A file system locking scheme can be adjusted to provide ranged locks on sub-blocks of a journal block. By locking sub-block ranges of a journal block, two independent operations on the same block that do not overlap on a sub-block range can operate independent of each other and be processed concurrently without requiring an exclusive lock over the entire block. BTL's can be established on a sub-block range level. Thus, only the range of the operation, thread, or process necessitates a lock or examining existing locking information while other sub-block portions of the block unrelated to the operation, thread or process can be ignored.

In one implementation, a flag can established for each individual delta field of a data structure, such as a metadata data structure. Thus, if a metadata data structure is sized at 8 kilobytes, and the block size for the file system is 8 kilobytes, flags can be associated with individual delta fields of the metadata structure that can signify whether the delta field is coherent or not coherent. For example, some operations, like operations altering metadata data fields, are order independent in that no matter the order in which multiple operations are processed the result will be the same. Using flags, these order independent operations can be logged over time and then later processed together when a coherent read is requested for the data field. Thus, when a delta read request is made to delta(s) associated with sub-block ranges of a data structure, those regions and associated flags can examined and it can be determined whether the data to be read on a sub-block is coherent as the delta read request is not concerned with the accuracy of other delta fields.

In one example implementation, an operation is received associated with a delta field. The file system can then examine whether a flag associated with the delta field indicates if the data of the field is coherent or incoherent. If the data is coherent, any ranged locking associated with the sub-block ranges of the delta field can be determined, and if the sub block locking does not conflict with the operation, then the operation can be committed to the journal and/or processed independently of another operation on the same sub-block range that does not have a conflicting lock or independently of another operation on different sub-block ranges of the same block. It can be appreciated that if the operation does conflict with pending operation (e.g., incompatible locking on the same sub-block range), then the operation can be processed in a manner where the second operation waits for the first operation to process in full prior to restarting.

In one implementation, sub-block range locking can be tracked in a hash table. In one implementation, a checksum can be used where the checksum indicates a current locking status of the set of sub block ranges associated with a set of delta fields of a file. In one implementation, the checksum can also store information relating to coherence, including, in one example, the presence of a coherence flag for each sub block range associated with a delta field.

FIGS. 1-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 1:
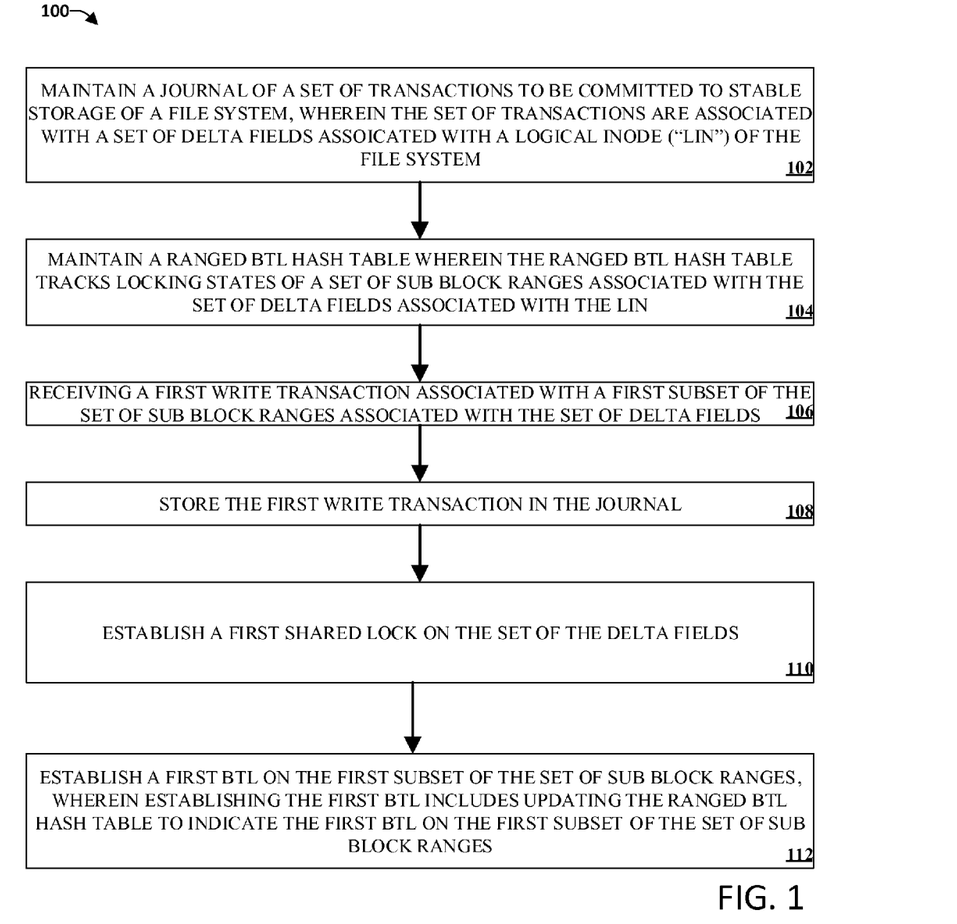
FIG. 1 illustrates an example method for processing a first write request associated with a sub block range of a data structure in accordance with implementations of this disclosure.

FIG. 1 illustrates an example method for processing a first write request associated with a sub block range of a data structure in accordance with implementations of this disclosure. At 102, a journal of set of transactions to be committed to stable storage of a file system can be maintained, wherein the set of transactions are associated with a set of delta fields associated with a logical inode ("LIN") of the file system. It can be appreciated that the transactions in the journal may relate to a subset of the set of delta fields, as each transaction may only read, modify, and/or write a subset of the set of delta fields.

At 104, a ranged buffer transaction lock ("BTL") hash table can be maintained, wherein the ranged BTL hash table tracks locking states of a set of sub block ranges associated with the set of delta fields associated with the LIN. In one implementation, the hash table can also associated coherency flags that can indicate whether individual delta fields are coherent.

At 106, a first write transaction associated with a first subset of the set of sub block ranges associated with the set of data fields can be received. For example, the write transaction may impact one delta field, a subset of delta fields less the entire set, or the entire set of delta fields.

At 108, the first write transaction can be stored in the journal.

At 110, a first shared lock can be established on the set of the delta fields. In one implementation, the shared lock is a shared LIN lock of the data structure, e.g., a top half lock.

In one implementation, if the shared lock cannot be established, for example, an exclusive LIN lock already exists on the on the set of delta fields, then the method can stop and wait at this step until a shared lock on the set of delta fields can be established. It can be appreciated that an exclusive lock on a sub-block range of the delta fields (e.g., a bottom half lock) may not stop the establishment of a shared LIN lock (e.g., a top half lock).

At 112, a first BTL on the first subset of the set of sub block ranges can be established, wherein establishing the first BTL includes updating the ranged BTL hash table to indicate the first BTL on the first subset of the set of sub block ranges. It can be appreciated that the first BTL is established only on the subset of sub block ranges associated with the first write transaction.

Figure 2:
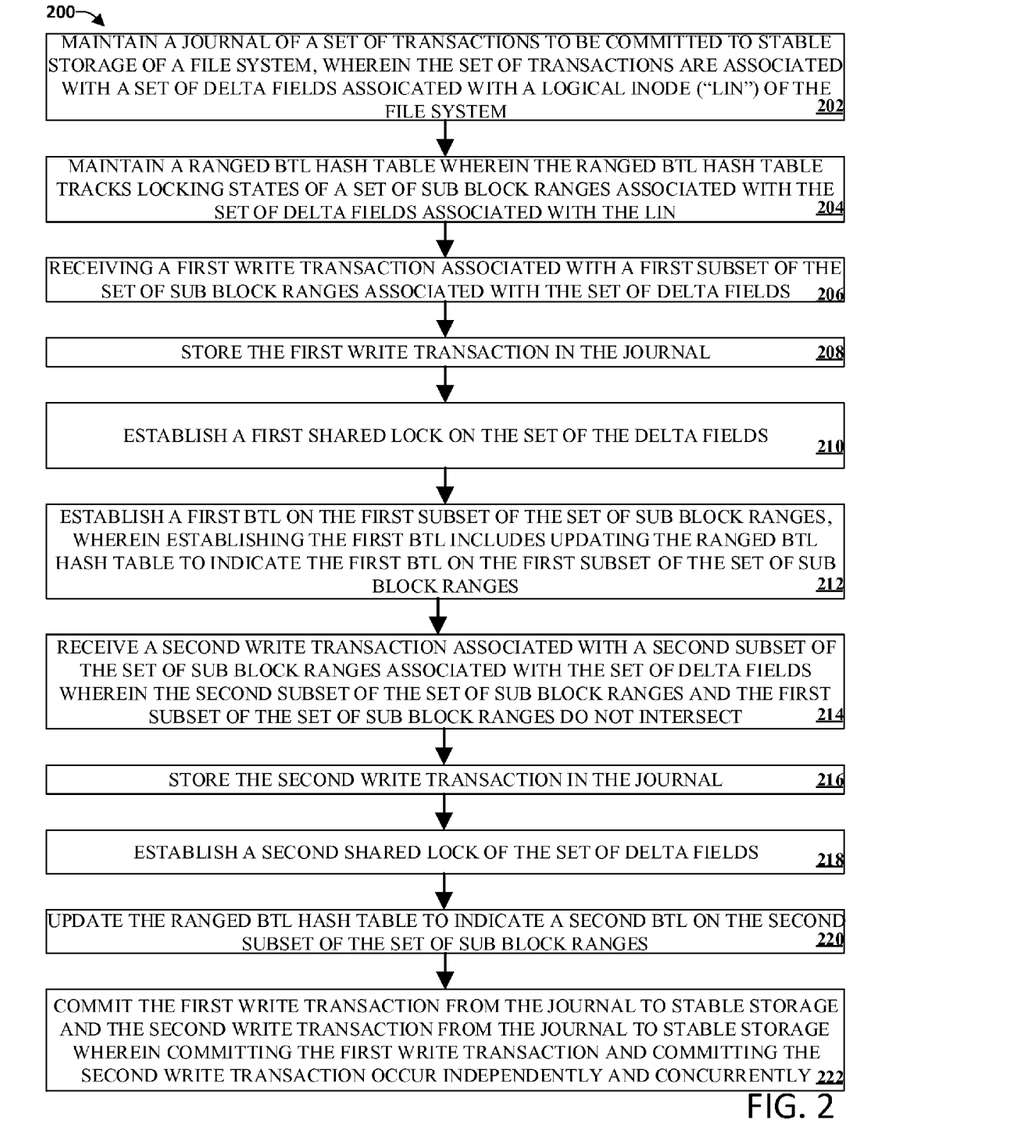
FIG. 2 illustrates an example method for concurrently processing two non-intersecting write requests to the same data block in accordance with implementations of this disclosure.

FIG. 2 illustrates an example method for concurrently processing two non-intersecting write requests to the same data block in accordance with implementations of this disclosure. Steps 202-212 are identical to steps 102-112 as described above with respect to FIG.

At 214, a second write transaction associated with a second subset of the set of sub block ranges associated with the set of delta fields can be received, wherein the second subset of the set of sub block ranges and the first subset of the set of sub block ranges do not intersect. For example, the first write transaction and the second write transaction involve writes to mutually exclusive subsets of delta fields. In this example, through the use of sub block locking, both transactions can be processed independently and concurrently. Prior to using sub block locking, the transaction would have to be processed sequentially as the entire block would be exclusively locked.

At 216, the second write transaction can be stored in the journal.

At 218, a second shared lock can be established on the set of the delta fields. It can be appreciated that multiple shared locks can exist on the same LIN or the same set of delta fields.

At 220, a second BTL can be established on the second subset of the set of sub block ranges, wherein establishing the second BTL includes updating the ranged BTL hash table to indicate a second exclusive lock on the second subset of the set of sub block ranges.

At 222, the first write transaction can be committed from the journal to stable storage and the second write transaction can be committed from the journal to stable storage, wherein committing the first write transaction and committing the second write transaction occur independently and concurrently.

Figure 3:
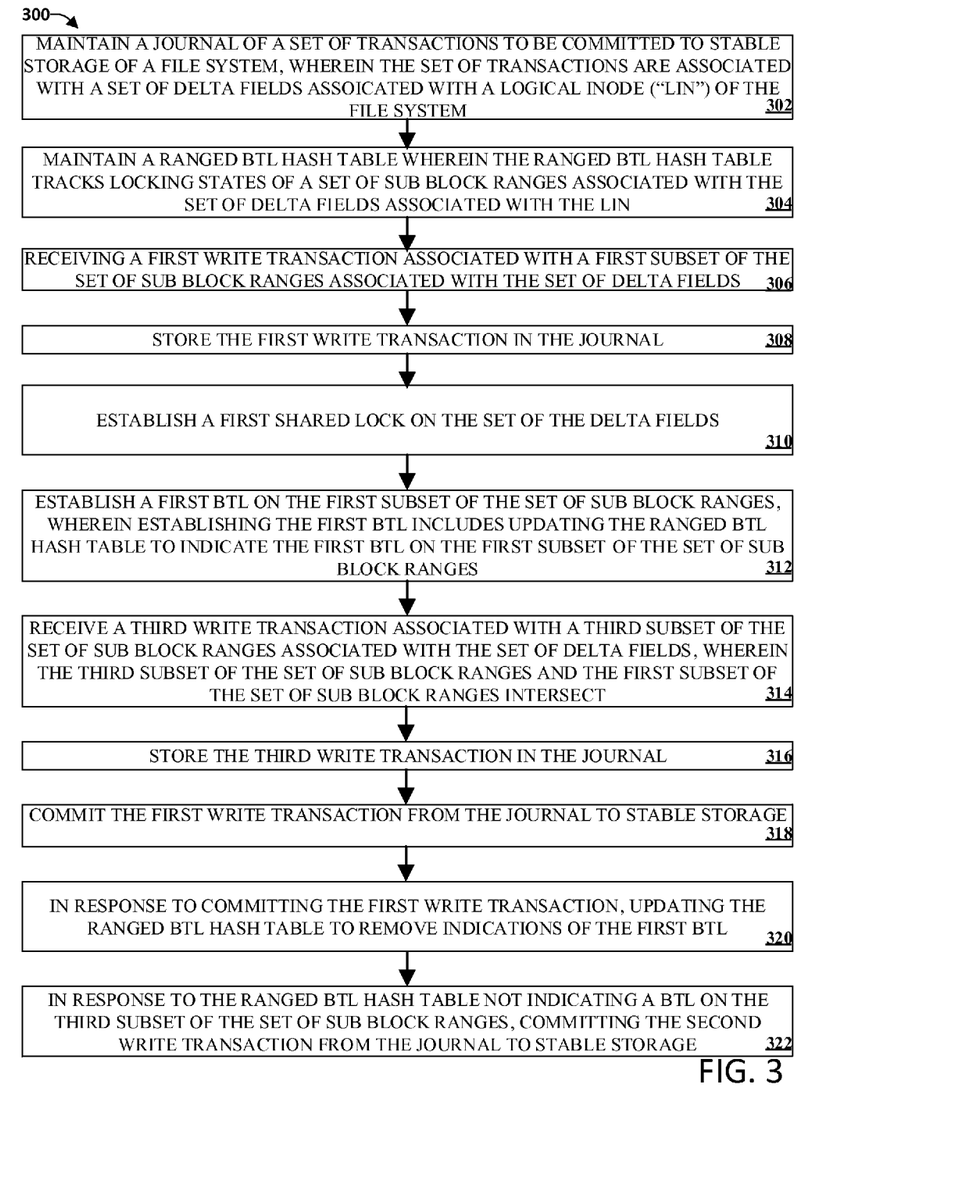
FIG. 3 illustrates an example method for processing two intersecting write requests to the same data block in accordance with implementations of this disclosure.

FIG. 3 illustrates an example method for processing two intersecting write requests to the same data block in accordance with implementations of this disclosure. Steps 302-312 are identical to steps 102-112 as described above with respect to FIG. 1.

At 314, a third write transaction associated with a third subset of the set of sub block ranges associated with the set of delta fields can be received, wherein the third subset of the set of sub block ranges and the first subset of the set of sub block ranges intersect. At 316, the third write transaction can be stored in the journal.

At 318, the first write transaction from the journal can be committed to stable storage. At 320, in response to committing the first write transaction, the ranged BTL hash table can be updated to remove indications of the first BTL.

At 322, in response to the ranged BTL hash table not indicated a BTL on the third subset of the set of sub block ranges, committing the second write transaction from the journal to stable storage.

Figure 4:
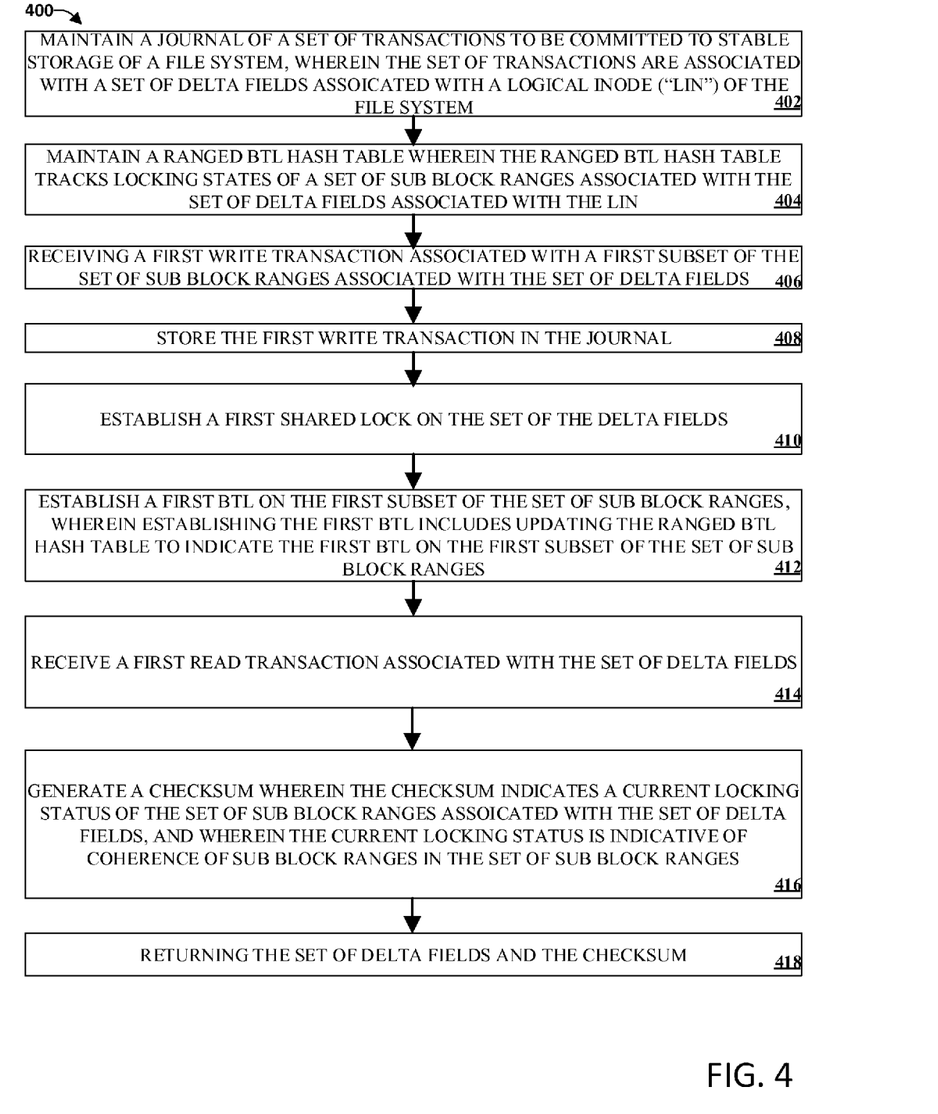
FIG. 4 illustrates an example method for processing a read request with a pending write request to the same data block in accordance with implementations of this disclosure.

FIG. 4 illustrates an example method for processing a read request with a pending write request to the same data block in accordance with implementations of this disclosure. Steps 402-412 are identical to steps 102-112 as described above with respect to FIG. 1.

At 414, a first read transaction associated with the set of delta fields can be received. At 416, a checksum can be generated, wherein the checksum indicates a current locking status of the set of sub block ranges associated with the set of delta fields, and wherein the current locking status is indicative of coherence of sub block ranges in the set of sub block ranges. It can be appreciated that a client can read the checksum and determine which delta fields are coherent and incoherent based on the checksum.

At 418, the set of delta fields and the checksum can be returned to the client. In one implementation, returning the set of delta fields and the checksum to the client is based on the coherence of the set of delta fields and a subset of the set of delta fields associated with the first read transaction. For example, if the read transaction was associated with a subset of delta fields that were incoherent, the process may wait until the subset of delta fields are coherent prior to returning the set of delta fields.

In one implementation, the method further calls for committing a set of pending transactions from the journal associated with a subset of delta fields associated with the first read transaction wherein committing the set of pending transactions generates data coherency on the subset of delta fields. It can be appreciated that if the read request is for a subset of delta fields that are incoherent, the process calls for committing pending transactions associated with the incoherent delta fields until the field becomes coherent.

Figure 5:
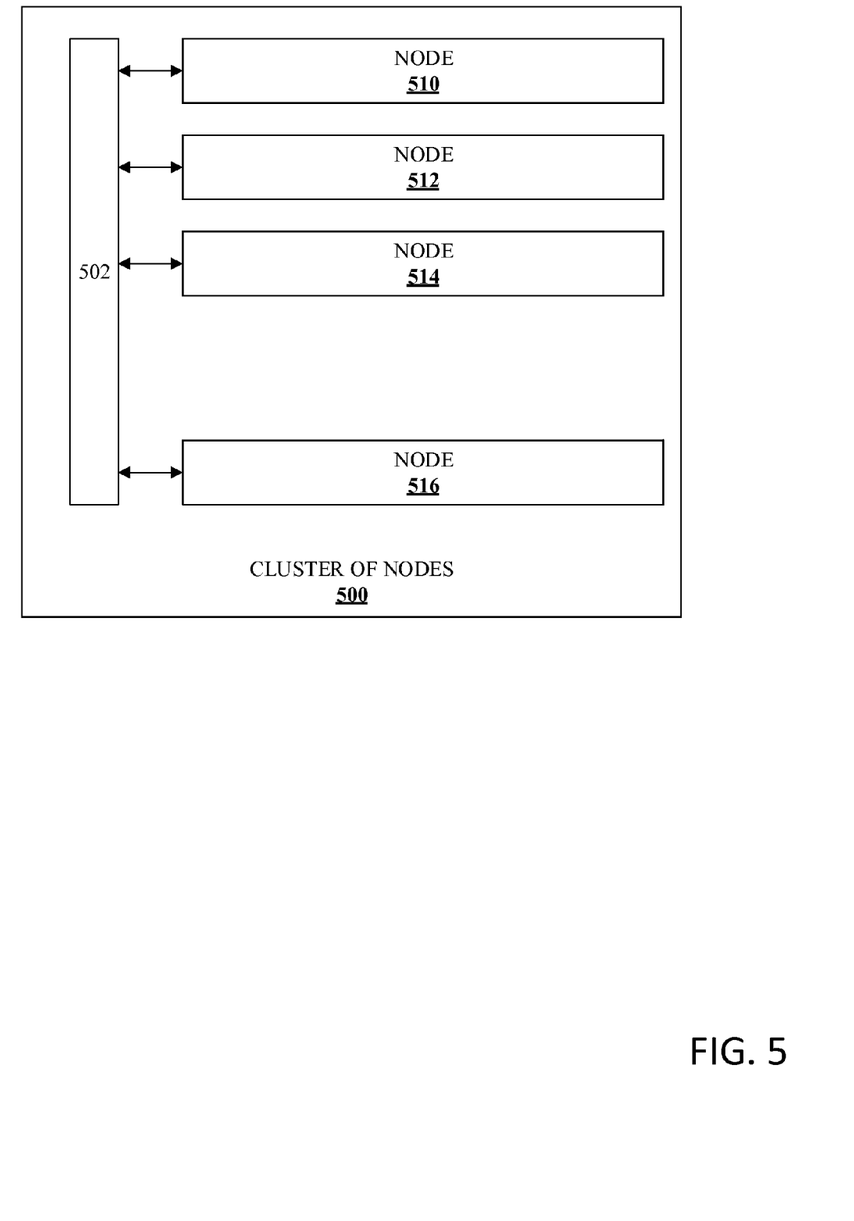
FIG. 5 illustrates an example block diagram of a cluster of nodes in accordance with implementations of this disclosure.

FIG. 5 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 510, 512, 514 and 516 operating in a cluster; however, it can be appreciated that more or less nodes can make up a cluster. It can be further appreciated that nodes among the cluster of nodes do not have to be in a same enclosure as shown for ease of explanation in FIG. 5, and be geographically disparate. Backplane 502 can be any type of commercially available networking infrastructure that allows nodes among the cluster of nodes to communicate amongst each other in as close to real time as the networking infrastructure allows. It can be appreciated that the backplane 502 can also have a separate power supply, logic, I/O, etc. as necessary to support communication amongst nodes of the cluster of nodes.

It can be appreciated that the Cluster of Nodes 500 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 6:
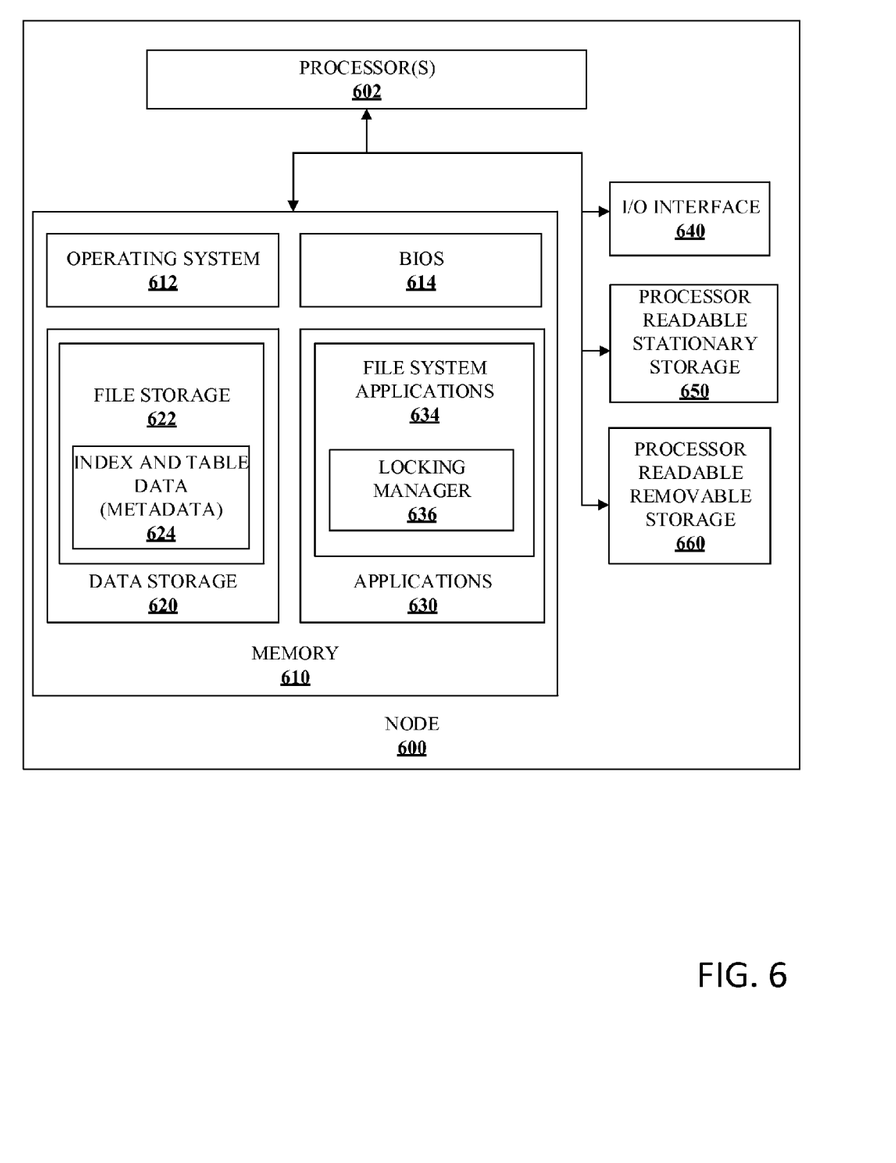
FIG. 6 illustrates an example block diagram of a node in accordance with implementations of this disclosure.

FIG. 6 illustrates an example block diagram of a node 600 in accordance with implementations of this disclosure.

Node 600 includes processor 602 which communicates with memory 610 via a bus. Node 600 also includes input/output interface 640, processor-readable stationary storage device(s) 650, and processor-readable removable storage device(s) 660. Input/output interface 640 can enable node 600 to communicate with other nodes, mobile devices, network devices, and the like. Processor-readable stationary storage device 650 may include one or more devices such as an electromagnetic storage device (hard disk), solid state hard disk (SSD), hybrid of both an SSD and a hard disk, and the like. In some configurations, a node may include many storage devices. Also, processor-readable removable storage device 660 enables processor 602 to read non-transitive storage media for storing and accessing processor-readable instructions, modules, data structures, and other forms of data. The non-transitive storage media may include Flash drives, tape media, floppy media, disc media, and the like.

Memory 610 may include Random Access Memory (RAM), Read-Only Memory (ROM), hybrid of RAM and ROM, and the like. As shown, memory 610 includes operating system 612 and basic input/output system (BIOS) 614 for enabling the operation of node 600. In various embodiments, a general-purpose operating system may be employed such as a version of UNIX, LINUX™, a specialized server operating system such as Microsoft's Windows Server™ and Apple Computer's IoS Server™, or the like.

Applications 630 may include processor executable instructions which, when executed by node 600, transmit, receive, and/or otherwise process messages, audio, video, and enable communication with other networked computing devices. Examples of application programs include database servers, file servers, calendars, transcoders, and so forth. Applications 630 may include, for example, file system applications 634, and cursor applications 636 according to implementations of this disclosure. It can be appreciated that cursor application 636 can store information in memory 610 such as in a cache or the like for use during restripe operations as discussed supra.

Human interface components (not pictured), may be remotely associated with node 600, which can enable remote input to and/or output from node 600. For example, information to a display or from a keyboard can be routed through the input/output interface 640 to appropriate peripheral human interface components that are remotely located. Examples of peripheral human interface components include, but are not limited to, an audio interface, a display, keypad, pointing device, touch interface, and the like.

Data storage 620 may reside within memory 610 as well, storing file storage 622 data such as metadata or LIN data. It can be appreciated that LIN data and/or metadata can relate to rile storage within processor readable stationary storage 650 and/or processor readable removable storage 660. For example, LIN data may be cached in memory 610 for faster or more efficient frequent access versus being stored within processor readable stationary storage 650. In addition, Data storage 620 can also host index and table data 624 such as cursor data in accordance with implementations of this disclosure. Index and table data can be stored as files in file storage 622.

In at least one of the various embodiments, a file may be referenced by an inode that may contain file meta-data, including references, and/or pointers to the file's data blocks. In at least one of the various embodiments, if writers want to write to a file they may need to obtain a lock on the inode to prevent other writers from changing the contents of the inode while a writer is in the middle of a write transaction. In at least one of the various embodiments, the file may be distributed among one or more data storage servers in a distributed data cluster.

In at least one of the various embodiments, a lock manager may be arranged to coordinate the locking protocol between writers or readers and file resources, including the inodes and file data. A lock manager may be part of an operating system 612 or file system. In at least one of the various embodiments, a lock manager manages lock contention among distributed writers or readers within and among distributed nodes of a data cluster. In at least one of the various embodiments, writers or readers of files access the information in an inode by using file system calls, operating system calls, API's, or the like. In at least one of the various embodiments, locking rules may be enforced by a lock manager. A lock manager may enforce the lock rules across a file system that may be implemented on one or more computing devices. A file system may be distributed among multiple data storage nodes and compute nodes.

Also, individual files may be distributed across one or more nodes that may be arranged in a cluster. However, in at least one of the various embodiments, there may be a single logical inode for each file that may be required to maintain file system consistency. In at least one of the various embodiments, a locking manager may control access to inodes based on a locking protocol that may include delta read locks and delta write locks. For example, in at least one of the various embodiments, multiple writers or readers across multiple data storage nodes may be concurrently contending for access to files that likewise may be stored across multiple data storage nodes. A locking manager may be arranged to enforce the locking protocol and guarantee that the inode of the distributed file data remains consistent. Locking managers may also be responsible for ensuring that delta writes that may have been recorded as journal deltas may be reconciled and resolved if required, such as if a preparing to grant a process a shared or exclusive lock.

The illustrated aspects of the disclosure can be practiced in distributed computing environments where certain tasks are performed by remote processing devices that are linked through a communications network. In a distributed computing environment, program modules can be located in both local and remote memory storage devices.

Throughout the specification and claims, the following terms take the meanings explicitly associated herein, unless the context clearly dictates otherwise. The phrase "in one implementation" as used herein does not necessarily refer to the same implementation, though it may. Furthermore, the phrase "in another implementation" as used herein does not necessarily refer to a different implementation, although it may. Thus, as described above, various implementations of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    maintaining a journal of a set of transactions to be committed to stable storage of a file system, wherein the set of transactions are associated with a set of delta fields associated with a logical inode ("LIN") of the file system;
    maintaining a ranged buffer transaction lock ("BTL") hash table wherein the ranged BTL hash table tracks locking states of a set of sub block ranges associated with the set of delta fields associated with the LIN;
    receiving a first write transaction associated with a first subset of the set of sub block ranges associated with the set of delta fields;
    storing the first write transaction in the journal;
    establishing a first shared lock on the set of the delta fields; and
    establishing a first BTL on the first subset of the set of sub block ranges, wherein establishing the first BTL includes updating the ranged BTL hash table to indicate the first BTL on the first subset of the set of sub block ranges.

2. The method of claim 1, further comprising:
    receiving a second write transaction associated with a second subset of the set of sub block ranges associated with the set of delta fields, wherein the second subset of the set of sub block ranges and the first subset of the set of sub block ranges do not intersect;
storing the second write transaction in the journal;
establishing a second shared lock on the set of the delta fields;
establishing a second BTL on the second subset of the set of sub block ranges, wherein establishing the second BTL includes updating the ranged BTL hash table to indicate a second BTL on the second subset of the set of sub block ranges; and
committing the first write transaction from the journal to stable storage and the second write transaction from the journal to stable storage wherein committing the first write transaction and committing the second write transaction occur independently and concurrently.

3. The method of claim 1, further comprising:
receiving a third write transaction associated with a third subset of the set of sub block ranges associated with the set of delta fields, wherein the third subset of the set of sub block ranges and the first subset of the set of sub block ranges intersect;
storing the third write transaction in the journal;
committing the first write transaction from the journal to stable storage;
in response to committing the first write transaction, updating the ranged BTL hash table to remove indications of the first BTL;
in response to the ranged BTL hash table not indicating a BTL on the third subset of the set of sub block ranges, committing the second write transaction from the journal to stable storage.

4. The method of claim 1, further comprising:
receiving a first read transaction associated with the set of delta fields;
generating a checksum wherein the checksum indicates a current locking status of the set of sub block ranges associated with the set of delta fields, and wherein the current locking status is indicative of coherence of sub block ranges in the set of sub block ranges; and
returning the set of delta fields and the checksum.

5. The method of claim 4, wherein the returning the set of delta fields and the checksum to the client is based on the coherence of the set of delta fields and a subset of the set of delta fields associated with the first read transaction.

6. The method of claim 4, further comprising:
committing a set of pending transactions from the journal associated with a subset of delta fields associated with the first read transaction wherein committing the set of pending transactions generates data coherency on the subset of delta fields.

7. A system comprising at least one storage device and at least one hardware processor configured to:
maintain a journal of a set of transactions to be committed to stable storage of a file system, wherein the set of transactions are associated with a set of delta fields associated with a logical inode ("LIN") of the file system;
maintain a ranged buffer transaction lock ("BTL") hash table wherein the ranged BTL hash table tracks locking states of a set of sub block ranges associated with the set of delta fields associated with the LIN;
receive a first write transaction associated with a first subset of the set of sub block ranges associated with the set of delta fields;
store the first write transaction in the journal;
establish a first shared lock on the set of the delta fields; and
establish a first BTL on the first subset of the set of sub block ranges, wherein establishing the first BTL includes updating the ranged BTL hash table to indicate the first BTL on the first subset of the set of sub block ranges.

8. The system of claim 7 further configured to:
receive a second write transaction associated with a second subset of the set of sub block ranges associated with the set of delta fields, wherein the second subset of the set of sub block ranges and the first subset of the set of sub block ranges do not intersect;
store the second write transaction in the journal;
establish a second shared lock on the set of the delta fields;
establish a second BTL on the second subset of the set of sub block ranges, wherein establishing the second BTL includes updating the ranged BTL hash table to indicate a second BTL on the second subset of the set of sub block ranges; and
commit the first write transaction from the journal to stable storage and the second write transaction from the journal to stable storage wherein committing the first write transaction and committing the second write transaction occur independently and concurrently.

9. The system of claim 7 further configured to:
receive a third write transaction associated with a third subset of the set of sub block ranges associated with the set of delta fields, wherein the third subset of the set of sub block ranges and the first subset of the set of sub block ranges intersect;
store the third write transaction in the journal;
commit the first write transaction from the journal to stable storage;
in response to committing the first write transaction, update the ranged BTL hash table to remove indications of the first BTL;
in response to the ranged BTL hash table not indicating a BTL on the third subset of the set of sub block ranges, commit the second write transaction from the journal to stable storage.

10. The system of claim 7 further configured to:
receive a first read transaction associated with the set of delta fields;
generate a checksum wherein the checksum indicates a current locking status of the set of sub block ranges associated with the set of delta fields, and wherein the current locking status is indicative of coherence of sub block ranges in the set of sub block ranges; and
return the set of delta fields and the checksum.

11. The system of claim 10, wherein the returning the set of delta fields and the checksum to the client is based on the coherence of the set of delta fields and a subset of the set of delta fields associated with the first read transaction.

12. The system of claim 10 further configured to:
commit a set of pending transactions from the journal associated with a subset of delta fields associated with the first read transaction wherein committing the set of pending transactions generates data coherency on the subset of delta fields.

13. A non-transitory computer readable medium with program instructions stored thereon to perform the following acts:
maintaining a journal of a set of transactions to be committed to stable storage of a file system, wherein the set of transactions are associated with a set of delta fields associated with a logical inode ("LIN") of the file system;

maintaining a ranged buffer transaction lock ("BTL") hash table wherein the ranged BTL hash table tracks locking states of a set of sub block ranges associated with the set of delta fields associated with the LIN;

receiving a first write transaction associated with a first subset of the set of sub block ranges associated with the set of delta fields;

storing the first write transaction in the journal;

establishing a first shared lock on the set of the delta fields; and establishing a first BTL on the first subset of the set of sub block ranges, wherein establishing the first BTL includes updating the ranged BTL hash table to indicate the first BTL on the first subset of the set of sub block ranges.

14. The non-transitory computer readable medium of claim 12 with program instructions stored thereon to further perform the following acts:

receiving a second write transaction associated with a second subset of the set of sub block ranges associated with the set of delta fields, wherein the second subset of the set of sub block ranges and the first subset of the set of sub block ranges do not intersect;

storing the second write transaction in the journal;

establishing a second shared lock on the set of the delta fields;

establishing a second BTL on the second subset of the set of sub block ranges, wherein establishing the second BTL includes updating the ranged BTL hash table to indicate a second BTL on the second subset of the set of sub block ranges; and committing the first write transaction from the journal to stable storage and the second write transaction from the journal to stable storage wherein committing the first write transaction and committing the second write transaction occur independently and concurrently.

15. The non-transitory computer readable medium of claim 12 with program instructions stored thereon to further perform the following acts:

receiving a third write transaction associated with a third subset of the set of sub block ranges associated with the set of delta fields, wherein the third subset of the set of sub block ranges and the first subset of the set of sub block ranges intersect;

storing the third write transaction in the journal;

committing the first write transaction from the journal to stable storage;

in response to committing the first write transaction, updating the ranged BTL hash table to remove indications of the first BTL;

in response to the ranged BTL hash table not indicating a BTL on the third subset of the set of sub block ranges, committing the second write transaction from the journal to stable storage.

16. The non-transitory computer readable medium of claim 12 with program instructions stored thereon to further perform the following acts:

receiving a first read transaction associated with the set of delta fields;

generating a checksum wherein the checksum indicates a current locking status of the set of sub block ranges associated with the set of delta fields, and wherein the current locking status is indicative of coherence of sub block ranges in the set of sub block ranges; and returning the set of delta fields and the checksum.

17. The non-transitory computer readable medium of claim 16, wherein the returning the set of delta fields and the checksum to the client is based on the coherence of the set of delta fields and a subset of the set of delta fields associated with the first read transaction.

18. The non-transitory computer readable medium of claim 16 with program instructions stored thereon to further perform the following acts:

committing a set of pending transactions from the journal associated with a subset of delta fields associated with the first read transaction wherein committing the set of pending transactions generates data coherency on the subset of delta fields.

* * * * *